United States Patent [19]
Muterel

[11] 3,947,648
[45] Mar. 30, 1976

[54] BRAKE PRESSURE IMBALANCE SWITCH

[75] Inventor: Roland Muterel, Bessancourt, France

[73] Assignee: Societe Anonyme D.B.A., Paris, France

[22] Filed: Nov. 14, 1974

[21] Appl. No.: 523,955

[30] Foreign Application Priority Data
Dec. 7, 1973 France .......................... 73.43742

[52] U.S. Cl. ................ 200/82 D; 340/52 C; 116/70
[51] Int. Cl.² ........................................ H01H 35/38
[58] Field of Search...: 188/151 R, 151 A; 303/6 C; 73/39, 419; 340/52 C; 116/70, 117 R; 200/82 D

[56] References Cited
UNITED STATES PATENTS

| | | | |
|---|---|---|---|
| 3,567,884 | 3/1971 | Douglas | 200/82 D |
| 3,699,513 | 10/1972 | Nicodeme | 200/82 D |
| 3,782,780 | 1/1974 | Orzel | 340/52 C |

*Primary Examiner*—Gerald P. Tolin
*Attorney, Agent, or Firm*—Leo H. McCormick, Jr.; William N. Antonis

[57] ABSTRACT

A switch apparatus for detecting an imbalance condition between a first fluid circuit and a second fluid circuit. The switch apparatus has a housing with a bore therein in which a sleeve is located. The sleeve has a peripheral section which is electrically non-conductive and a central bore therethrough with a first diameter and a second diameter. A first piston is located in the first diameter and a second piston is located in the second diameter. A pin is connected to the second piston to limit the movement thereof in the central bore. When a pressure imbalance occurs, the sleeve will move and allow a plunger to move off the non-conductive peripheral surface to complete an electric circuit to inform an operator of a potential brake system failure.

5 Claims, 1 Drawing Figure

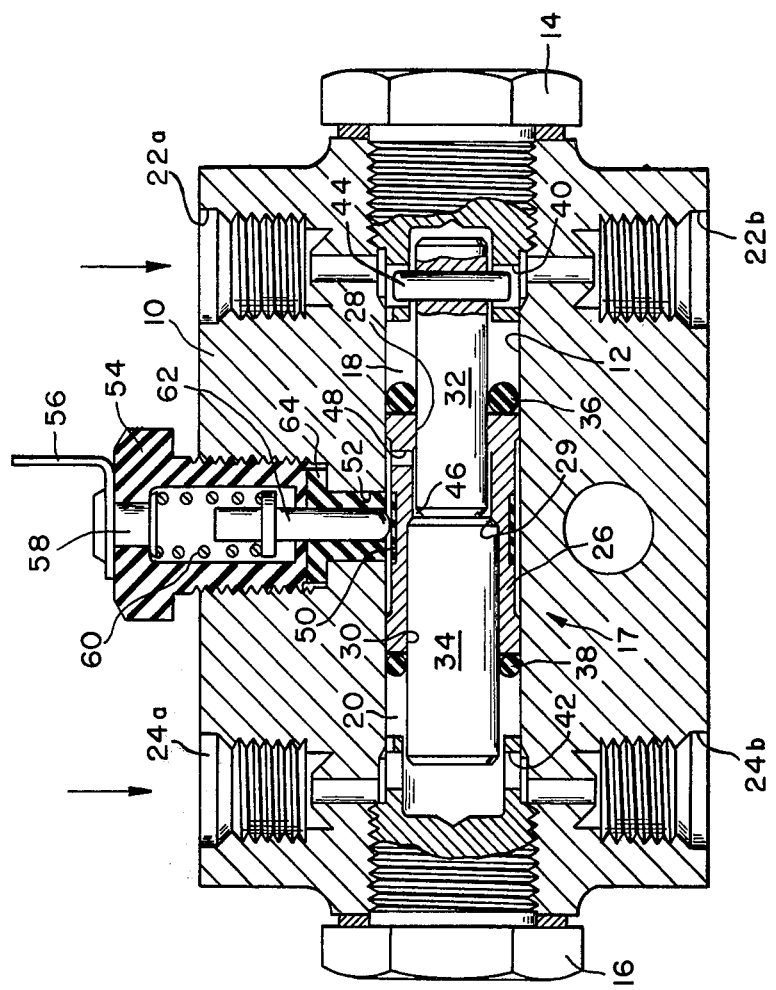

BRAKE PRESSURE IMBALANCE SWITCH

The invention relates to a pressure imbalance detector, more particularly for the motor industry, which can be used in hydraulic brake systems having two independent circuits, in order to operate an indicator device when one of the brake circuits fails.

There are known imbalance detectors of the type comprising a housing having a bore in which there moves a movable assembly separating two pressure chambers which are situated at opposite ends of the bore and are connectible to two independent pressure fluid circuits, and a switch responsive to movements of one component of the movable assembly out of its central, idle position under the influence of a pressure difference between the two circuits, the switch being designed to control the electrical circuit for an indicating device.

It is desirable, firstly, for the signal indicating failure of a hydraulic circuit to be maintained after the brake pedal is released and, secondly, for the detector to return to its idle position automatically after the faulty circuit has been repaired. For these reasons designers have proposed detectors with movable assemblies comprising a plurality of components, which slide relative to each other in a fluid-tight manner and have different effective cross-sections depending on their relative positions. These components of the movable assembly cooperate with one another by means of sliding surfaces whose generatrices are parallel to the axis of the bore and are at different distances from this axis. A device of the kind referred to is shown in U.S. Pat. No. 3,669,506.

Known imbalance detectors having the advantages described above, i.e. a maintained signal and automatic return to the idle position, have at least three components i.e. one housing and a two pieces, each component of the movable assembly having tw sliding surfaces cooperating respectively with one of the other two components. This design requires extremely narrow manufacturing tolerances if the movable assembly is to be assembled correctly, since each component is set in position by being fitted to both the other components.

An imbalance detector for a motor vehicle is a safety device, and is not called upon to operate very often. The various components of the movable assembly may therefore remain inactive for several years, even though the vehicle is in use. These special operating conditions make the assembly liable to jam in its bore. Designers seek to reduce this risk to a minimum, since jamming makes a detector completely ineffective.

An object of the invention is to provide an imbalance detector with a maintained signal and automatic return to the idle position, of a design permitting wider tolerances. To this end, the invention proposes an imbalance detector of the type described above, in which the movable assembly consists of a sleeve slidable in the bore and cooperating with the switch, the sleeve being traversed with a central bore with a portion of smaller diameter and a portion of larger diameter opening respectively into each of the pressure chambers, and of two separate pistons of different diameters slidable in the corresponding portions of the central bore, each piston cooperating with the housing by an abutment connection to limit the stroke of each piston out of a idle central position and inwards into the pressure chamber adjacent to the other piston to a slight axial play.

In a preferred embodiment of the invention, the abutment connection between the piston of larger diameter and the housing is effected through the piston of smaller diameter, the pistons being capable of abutting on one another, and the piston of smaller diameter is connected to the housing by a double abutment connection with slight axial play on either side of its idle cent position.

The invention will be better understood from the ensuing description, referring to the single FIGURE representing a section through an imbalance detector embodying the invention.

The imbalance detector shown in the FIGURE has a housing 10 containing a bore 12, closed at each end by a plug 14 or 16. A movable assembly 17 separates both ends of the bore, defining therein two chambers 18, 20 connectible independently to two separate brake circuits in a single motor vahicle. To this end each chamber communicates with two outlet orifices 22, 24. By way of example, the orifices 22a, 24a are connected separately to the pressure chambers of a conventional tandem master cylinder (not shown), whereas the orifices 22b, 24b are connected separately to two sets of brake actuators (not shown). The movable assembly is formed of a sleeve 26, which is slidable in the bore 12 and itself contains a central bore consisting of a portion 28 of smaller diameter and a portion 30 of larger diameter, separated by a shoulder 29; and of two pistons 32, 34 mounted in a fluid-tight manner in the portions 28, 30 respectively of the sleeve 26. O-ring seals 36, 38 of different diametrical sections are placed at opposite ends of the sleeve to provide a double seal between the wall of the bore 12 and each piston. The free ends of each piston project with slight radial clearance into cavities provided for this purpose in the plugs 14, 16. The plugs act as abutments for the seals when the sleeve is moved out of the central, idle position illustrated. Each plug 14, 16 which should be considered as a part of the housing of the imbalance detector, contains an aperture 40 or 42 extending diametrically with respect to the bore 12. A pin 44 fixed to the free end of the piston 32 of smaller diameter projects into the bore 40 to provide, between the piston 32 and the housing, a double abutment connection with slight axial play of less than one millimeter. In addition, to enable the sleeve 26 and piston 34 to move freely relative to the piston 32, a compartment 46 is provided between these three elements and is connected to the atmosphere by a duct 48. The position of the bore 40 and the dimensions of the various components of the detector are selected in such a way that the stroke of each piston out of the idle position illustrated and towards the pressure chamber adjacent to the other piston is restricted to a few tenths of a millimeter. In the embodiment of the invention here described, of course, the abutment connection between the piston 34 and the housing is effected by way of the piston 32.

In this particular embodiment, the sleeve 26 cooperates with a switch device connected to the electrical circuit of an indicator device (not shown).

The sleeve, which is of electrically conductive material, has on its periphery an insulating ring or central zone 50. The housing, which is also of electrically conductive material, contains a bore 52 receiving an insulating tubular member 54, to the outer end of which an electrical terminal 56 is attached by a metal rivet 58.

The terminal 56 is normally connected to the supply circuit of the indicator device, whereas the housing 10 is connected to the vehicle's earth. A coil spring 60 bearing on the rivet 58 urges an electrically conductive plunger 62 slidable in an insulating bushing 64 towards the interior of the bore 12.

The detector just described operates as follows.

Firstly, it should be noted that the single FIGURE illustrates the various components of the detector in their "idle" central position, which they occupy when both brake circuits are pressurized and when the pressures in the chambers 18, 20 remain substantially equal.

The pressures prevailing at either end of the sleeve urge the sleeve to the left in the FIGURE, so that it abuts on the shoulder 29 for the piston 34, and urge the piston 34 on to the piston 32 of smaller diameter. Let us assume a slight, momentary imbalance between the pressures in the chambers 18, 20, for example a pressure reduction in the chamber 18. The sleeve 26 and both pistons are urged to the right in the FIGURE. Both pistons are stopped by the pin, and the shoulder 29 moves off the piston 34. The difference between the effective cross-sections of the seals 36, 38 therefore causes the sleeve to return to the position illustrated, provided of course that the pressure reduction in the chamber 18 is only momentary. Similarly, a momentary pressure reduction in the chamber 20 will cause the sleeve and both pistons to move to the left in the FIGURE. The piston 32 is stopped by the pin and disengages from the piston 34. The difference between the combined effective cross-sections of the seal 38 and piston 34 and the effective cross-section of the seal 36 pushes the sleeve 26 and piston 34 back towards the position illustrated.

Because the axial clearances or plays between the pin 44 and the edges of the aperture 40 are slight, the movements of the piston 32 are very restricted, and the sleeve returns to a central idle position substantially fixed relative to the housing.

In this central, idle position the plunger 62 of the switch co-operates with the insulating zone 50 of the sleeve, and the indicator device is not energized. The zone 50 is wide enough to prevent failure being indicated erroneously when the sleeve oscillates about its central idle position. This situation may arise when the pressure increase in the brake circuits is not completely simultaneous. Lastly, when the driver releases his brake pedal, the various components of the movable assembly 17 remain in the position illustrated.

Let us assume that one of the brake circuits fails, for example the circuit associated with the chamber 18 of the detector. Under the influence of the pressure prevailing in the chamber 20, the movable assembly 17 moves to the right in the FIGURE. The piston 32 of smaller diameter is almost immediately stopped due to co-operation between the pin 44 and the right-hand portion of the bore 40, as is the piston 34 which abuts on the piston 32. The sleeve, however, is moved to the right in the FIGURE to abut on the plug 14, so that the plunger 62 makes contact with the left-hand metal portion of the sleeve 26, so that it works the electrical switch and operates the indicator device. It should be noted that when the driver releases his brake pedal, the sleeve 26 remains off-centre, and the fault signal is maintained. After the repair of the faulty circuit, the detector resumes its idle position as explained above the first time the brakes are operated, and the switch is off again.

If the faulty circuit is that associated with the chamber 20 of the detector, the sleeve 26 moves to the left in the FIGURE, entraining the piston 34. In the same way as before, the plunger 62 makes contact with the right-hand metal portion of the sleeve, and the fault signal is maintained even after the release of the brake pedal.

In the embodiment just described, the movement of the piston 34 of larger diameter from its idle position towards the chamber 18 stops when it abuts on the piston 32 of smaller diameter, which in turn is stopped by abutment of the pin 44 on the plug 14. In another embodiment of the invention (not shown), however, the piston 34 also has a pin inserted with clearance in the bore 42. In this case, to permit the sleeve to move into the chamber adjacent to the piston of larger diameter, the axial length of the corresponding bore must be increased.

In this other embodiment of the invention, the double abutment with slight axial play just described is replaced by two unidirectional abutments between the piston 32 and plug 14 and between the piston 34 and plug 16. In this case also, the axial play may be less than one millimeter, so limiting the stroke of each piston from its idle position into the chamber adjacent to the other piston.

It should be noted that, because of the special design of the movable assembly embodying the invention, only the sleeve 26 bears two sliding surfaces, which co-operate in a fluid-tight manner both with the bore 12 and with each piston respectively. Thus slightly imperfect coaxiality during machining of the stepped bore 28, 30 is not fatal to satisfactory operation of the device.

The invention is not restricted to a detector having an electrical switch of the type described, which has an insulating ring, but also covers detectors with switches of any known type, for example of the type having a V-groove on the sleeve.

I claim:

1. A brake pressure imbalance switch comprising:
   a housing having a bore therein;
   sleeve means slidable in said bore and separating the bore into a first pressure chamber and a second pressure chamber, said first pressure chamber being connected to a first source of fluid, said second chamber being connected to a second source of fluid, said sleeve means having an axial bore with a first diameter and a second diameter separated by a shoulder;
   first piston means located in said first diameter and extending into said first pressure chamber for communicating any fluid pressure in the first chamber into said sleeve means;
   second piston means located in said second diameter and extending into said second pressure chamber for communicating any fluid pressure from the second chamber into said first piston means to maintain said sleeve means in a central position in said bore of the housing when the fluid pressure in the first chamber and the second chamber is substantially equal;
   pin means connected between said housing for and said second piston limiting the movement of said second piston means with respect to said sleeve means; and cooperating contact means connected to said sleeve means for actuating an electrical circuit upon movement of said sleeve means in response to a pressure imbalance between the first chamber and the second chamber.

2. The brake pressure imbalance switch, as recited in claim 1, further including:

first plug means fixed to said housing having a first central aperture into which the first piston means projects, said first piston moving in said aperture in response to a first pressure differential until engagement with the first plug means to limit the movement of the sleeve means toward the first pressure chamber.

3. The brake pressure imbalance switch, as recited in claim 2, further including:

second plug means fixed to said housing having a second central aperture into which said second piston means extends for movement in response to a second pressure differential between the first chamber and the second chamber, said plug means having a radial aperture in which said pin means is located to limit the axial movement of the second piston in said second pressure chamber.

4. The brake pressure imbalance switch, as recited in claim 3, further including:

first seal means surrounding said first diameter piston means, engageable with said bore of the housing and abutting said first diameter of the sleeve means for preventing fluid from being communicated from the first pressure chamber; and second seal means surrounding said second diameter piston, engaging said bore of the housing, and abutting said second diameter of the sleeve means for preventing fluid from being communicated from the second pressure chamber.

5. The brake pressure imbalance switch, as recited in claim 4, further including:

insulating means surrounding said sleeve means to prevent said contact means from actuating said electrical circuit when said sleeve means is in said axial bore.

\* \* \* \* \*